(12) United States Patent
Buehler

(10) Patent No.: US 12,507,611 B2
(45) Date of Patent: Dec. 30, 2025

(54) DUAL SEED METER AND RELATED SYSTEMS AND METHODS

(71) Applicant: Ag Leader Technology, Ames, IA (US)

(72) Inventor: Brett Buehler, Dallas Center, IA (US)

(73) Assignee: Ag Leader Technology, Ames, IA (US)

( * ) Notice: Subject to any disclaimer, the term of this patent is extended or adjusted under 35 U.S.C. 154(b) by 0 days.

(21) Appl. No.: 18/079,569

(22) Filed: Dec. 12, 2022

(65) Prior Publication Data

US 2023/0105245 A1 Apr. 6, 2023

Related U.S. Application Data

(63) Continuation of application No. 16/752,989, filed on Jan. 27, 2020, now Pat. No. 11,523,554.

(60) Provisional application No. 62/796,641, filed on Jan. 25, 2019.

(51) Int. Cl.
*A01C 7/12* (2006.01)
*A01C 7/04* (2006.01)

(52) U.S. Cl.
CPC .............. *A01C 7/046* (2013.01); *A01C 7/122* (2013.01); *A01C 7/125* (2013.01)

(58) Field of Classification Search
CPC ....... A01C 7/122; A01C 7/125; A01C 21/005; A01C 7/046
See application file for complete search history.

(56) References Cited

U.S. PATENT DOCUMENTS

| 9,439 A | 12/1852 | Colver |
| 140,493 A | 7/1873 | Fulghum et al. |
| 540,458 A | 6/1895 | Robbins |
| 658,348 A | 9/1900 | Crowley |
| 717,048 A | 12/1902 | Stirling |
| 1,220,684 A | 3/1917 | Ray |
| 1,252,923 A | 1/1918 | Moench |

(Continued)

FOREIGN PATENT DOCUMENTS

| AU | 2018100865 B4 | 6/2022 |
| BR | 102015003633 A2 | 12/2015 |

(Continued)

OTHER PUBLICATIONS

Ag Leader Technology, "Ag Leader SureSpeed", Feb. 17, 2020, Publisher: YouTube.

(Continued)

*Primary Examiner* — Donnell A Long
(74) *Attorney, Agent, or Firm* — DENTONS DAVIS BROWN PC; Matthew Warner-Blankenship; Kassandra Ricklefs

(57) ABSTRACT

Disclosed herein are various embodiments of dual seed meters having a metering housing having first and second seed disks with a plurality of openings arranged along a curved path of each disk, wherein the disks overlap to form a convergence region such that seed traveling along the curved paths is delivered to a single point. Certain implementations also have a vacuum chamber defined between a first wall of the metering housing and the first and second seed disks and a seed chamber defined between a second wall of the metering housing and the first and second seed disks.

20 Claims, 8 Drawing Sheets

(56) References Cited

U.S. PATENT DOCUMENTS

| | | | |
|---|---|---|---|
| 1,264,454 | A | 4/1918 | Terrell |
| 1,376,933 | A | 5/1921 | Gould, Jr. |
| 1,397,689 | A | 11/1921 | Krotz |
| 1,566,187 | A | 12/1925 | Fifer |
| 1,997,791 | A | 4/1935 | Hoberg |
| 2,053,390 | A | 9/1936 | Bateman et al. |
| 2,054,552 | A | 9/1936 | Wakeham |
| 2,141,044 | A | 12/1938 | Rassmann |
| 2,340,163 | A | 1/1944 | White |
| 2,440,846 | A | 5/1948 | Cannon |
| 2,510,658 | A | 6/1950 | Rassmann |
| 2,525,435 | A | 10/1950 | White |
| 2,566,406 | A | 9/1951 | Dougherty |
| 2,589,762 | A | 3/1952 | Barnett et al. |
| 2,673,536 | A | 3/1954 | Skinner |
| 2,913,086 | A | 11/1959 | Wade |
| 2,975,936 | A | 3/1961 | Rousek |
| 2,980,043 | A | 4/1961 | Beck |
| 3,077,290 | A | 2/1963 | Rehder |
| 3,122,283 | A | 2/1964 | Walters |
| 3,176,636 | A | 4/1965 | Wilcox et al. |
| 3,253,739 | A | 5/1966 | Martin |
| 3,272,159 | A | 9/1966 | Sanderson |
| 3,325,060 | A | 6/1967 | Rehder |
| 3,343,507 | A | 9/1967 | Smith |
| 3,413,941 | A | 12/1968 | Roberson |
| 3,693,833 | A | 9/1972 | Weitz |
| 3,796,346 | A * | 3/1974 | Ribouleau ............. A01C 7/046 221/211 |
| 3,797,418 | A * | 3/1974 | Bridger, Jr. ............ A01C 7/006 111/140 |
| 3,913,503 | A | 10/1975 | Becker |
| 3,990,606 | A | 11/1976 | Gugenhan |
| 4,002,266 | A | 1/1977 | Beebe |
| 4,023,509 | A | 5/1977 | Hanson |
| 4,026,437 | A | 5/1977 | Biddle |
| 4,029,235 | A | 6/1977 | Grataloup |
| 4,037,755 | A | 7/1977 | Reuter |
| 4,193,523 | A | 3/1980 | Koning |
| 4,209,109 | A | 6/1980 | Curl |
| 4,282,985 | A | 8/1981 | Yamamoto |
| 4,288,008 | A | 9/1981 | Amblard |
| 4,324,347 | A | 4/1982 | Thomas |
| 4,333,561 | A | 6/1982 | Schlegel |
| 4,449,642 | A | 5/1984 | Dooley |
| 4,600,122 | A | 7/1986 | Lundie et al. |
| 4,613,056 | A * | 9/1986 | Olson ................... A01C 7/046 221/211 |
| 4,653,410 | A | 3/1987 | Typpi |
| 4,793,511 | A | 12/1988 | Ankum et al. |
| 4,899,672 | A | 2/1990 | Paul |
| 4,949,869 | A | 8/1990 | Ribouleau |
| 5,058,766 | A * | 10/1991 | Deckler ................. A01C 7/046 221/254 |
| 5,161,472 | A | 11/1992 | Handy |
| 5,170,909 | A | 12/1992 | Lundie et al. |
| 5,333,559 | A | 8/1994 | Hodapp |
| 5,501,366 | A | 3/1996 | Fiorido |
| 5,601,209 | A | 2/1997 | Barsi et al. |
| 5,664,507 | A | 9/1997 | Bergland et al. |
| 5,697,308 | A | 12/1997 | Rowlett |
| 5,720,233 | A | 2/1998 | Lodico |
| 5,740,747 | A * | 4/1998 | Stufflebeam ........... A01C 7/046 221/265 |
| 5,765,720 | A | 6/1998 | Stufflebeam |
| 5,799,598 | A | 9/1998 | Stufflebeam |
| 5,848,571 | A | 12/1998 | Stufflebeam |
| 5,915,313 | A * | 6/1999 | Bender ................. A01C 21/005 111/178 |
| 5,936,234 | A | 8/1999 | Thomas et al. |
| 5,975,283 | A | 11/1999 | Riffe |
| 6,116,172 | A | 9/2000 | Prairie |
| 6,142,086 | A | 11/2000 | Richard |
| 6,260,632 | B1 | 7/2001 | Bourgault et al. |
| 6,269,758 | B1 | 8/2001 | Sauder |
| 6,293,438 | B1 | 9/2001 | Woodruff |
| 6,352,042 | B1 | 3/2002 | Martin |
| 6,516,733 | B1 | 2/2003 | Sauder |
| 6,640,731 | B1 | 11/2003 | Rowlett |
| 6,651,570 | B1 | 11/2003 | Thiemke |
| 6,681,706 | B2 | 1/2004 | Sauder |
| 6,718,892 | B1 | 4/2004 | Rosenboom |
| 6,748,885 | B2 | 6/2004 | Sauder |
| 6,752,095 | B1 | 6/2004 | Rylander et al. |
| 7,131,384 | B2 | 11/2006 | Kester |
| 7,263,937 | B2 | 9/2007 | Frasier |
| 7,334,532 | B2 | 2/2008 | Sauder et al. |
| 7,404,366 | B2 | 7/2008 | Mariman |
| 7,448,334 | B2 | 11/2008 | Mariman |
| 7,490,565 | B2 | 2/2009 | Holly |
| 7,581,684 | B2 | 9/2009 | des Garennes et al. |
| 7,584,707 | B2 | 9/2009 | Sauder et al. |
| 7,661,377 | B2 | 2/2010 | Keaton |
| 7,854,206 | B2 | 12/2010 | Horsch |
| 7,918,168 | B2 | 4/2011 | Garner et al. |
| 8,074,586 | B2 | 12/2011 | Garner et al. |
| 8,276,529 | B2 | 10/2012 | Garner et al. |
| 8,322,293 | B2 | 12/2012 | Wollenhaupt et al. |
| 8,336,471 | B2 | 12/2012 | Gilstring |
| 8,375,873 | B2 | 2/2013 | Nelson et al. |
| 8,375,874 | B2 | 2/2013 | Peterson |
| 8,443,742 | B2 | 5/2013 | Orrenius |
| 8,448,585 | B2 | 5/2013 | Wilhelmi et al. |
| 8,468,960 | B2 | 6/2013 | Garner et al. |
| 8,522,699 | B2 | 9/2013 | Garner et al. |
| 8,544,395 | B2 | 10/2013 | Dietrich |
| 8,671,856 | B2 | 3/2014 | Garner et al. |
| 8,677,914 | B2 | 3/2014 | Stark |
| 8,746,159 | B2 | 6/2014 | Garner et al. |
| 8,789,482 | B2 | 7/2014 | Garner et al. |
| 8,789,483 | B2 | 7/2014 | Gilstring |
| 8,800,457 | B2 | 8/2014 | Garner et al. |
| 8,813,663 | B2 | 8/2014 | Garner et al. |
| 8,850,995 | B2 | 10/2014 | Garner |
| 8,850,998 | B2 | 10/2014 | Garner et al. |
| 8,903,545 | B2 | 12/2014 | Riffe |
| 8,942,896 | B2 | 1/2015 | Mayerle |
| 8,978,564 | B2 | 3/2015 | Hagny |
| 8,985,037 | B2 | 3/2015 | Radtke |
| 9,119,342 | B2 | 9/2015 | Bonefas |
| 9,137,941 | B2 | 9/2015 | Stark |
| 9,148,992 | B2 | 10/2015 | Steater |
| 9,151,388 | B2 | 10/2015 | Gilstring |
| 9,265,191 | B2 | 2/2016 | Sauder |
| 9,277,688 | B2 | 3/2016 | Wilhelmi |
| 9,282,691 | B2 | 3/2016 | Wilhelmi |
| 9,282,692 | B2 | 3/2016 | Wilhelmi |
| 9,313,941 | B2 | 4/2016 | Garner et al. |
| 9,313,942 | B2 | 4/2016 | Wilhelm |
| 9,332,689 | B2 | 5/2016 | Baurer et al. |
| 9,345,188 | B2 | 5/2016 | Garner et al. |
| 9,351,440 | B2 | 5/2016 | Sauder |
| 9,426,940 | B2 | 8/2016 | Connors et al. |
| 9,433,141 | B2 | 9/2016 | Friestad et al. |
| 9,480,199 | B2 | 11/2016 | Garner et al. |
| 9,491,901 | B2 | 11/2016 | Gentili |
| 9,510,502 | B2 | 12/2016 | Garner et al. |
| 9,544,395 | B2 | 1/2017 | Richardson et al. |
| 9,578,802 | B2 | 2/2017 | Radtke |
| 9,603,298 | B2 | 3/2017 | Wendte et al. |
| 9,622,402 | B2 | 4/2017 | Kinzenbaw et al. |
| 9,629,301 | B2 | 4/2017 | Gentili |
| 9,629,302 | B2 | 4/2017 | Gentili |
| 9,661,799 | B2 | 5/2017 | Garner et al. |
| 9,668,402 | B2 | 6/2017 | Hagny |
| 9,675,002 | B2 | 6/2017 | Roszman |
| 9,686,906 | B2 | 6/2017 | Garner et al. |
| 9,693,498 | B2 | 7/2017 | Zumdome |
| 9,699,955 | B2 | 7/2017 | Garner et al. |
| 9,706,702 | B2 | 7/2017 | Wendte et al. |
| 9,730,379 | B2 * | 8/2017 | Wendte ................ A01C 21/005 |
| 9,733,634 | B2 | 8/2017 | Prickel |
| 9,756,779 | B2 | 9/2017 | Wilhelmi et al. |

(56) References Cited

U.S. PATENT DOCUMENTS

| | | |
|---|---|---|
| 9,769,978 B2 | 9/2017 | Radtke |
| 9,807,921 B2 | 11/2017 | Levy et al. |
| 9,807,922 B2 | 11/2017 | Garner et al. |
| 9,807,924 B2 | 11/2017 | Garner et al. |
| 9,814,176 B2 | 11/2017 | Kowalchuk |
| 9,820,427 B2 | 11/2017 | Hagny |
| 9,820,429 B2 | 11/2017 | Garner et al. |
| 9,832,924 B2 | 12/2017 | Anderson |
| 9,861,025 B2 | 1/2018 | Schaefer et al. |
| 9,861,031 B2 | 1/2018 | Garner et al. |
| 9,872,424 B2 | 1/2018 | Baurer et al. |
| 9,936,627 B2 | 4/2018 | Wilhelmi et al. |
| 9,936,628 B2 | 4/2018 | Wilhelmi et al. |
| 9,949,426 B2 | 4/2018 | Radtke |
| 9,980,426 B2 | 5/2018 | Wilhelmi et al. |
| 10,004,173 B2 | 6/2018 | Garner et al. |
| 10,010,024 B2 | 7/2018 | Pirkenseer et al. |
| 10,045,477 B2 | 8/2018 | Hagny |
| 10,051,782 B2 | 8/2018 | Wilhelmi et al. |
| 10,104,832 B2 | 10/2018 | Wilhelmi et al. |
| 10,154,623 B2 | 12/2018 | Wilhelmi et al. |
| 10,206,326 B2 | 2/2019 | Garner et al. |
| 10,257,973 B2 | 4/2019 | Hubner et al. |
| 10,299,425 B2 | 5/2019 | Sauder et al. |
| 10,398,077 B2 | 9/2019 | Radtke |
| 10,470,358 B2 | 11/2019 | Sauder et al. |
| 10,485,159 B2 | 11/2019 | Wilhelmi et al. |
| 10,609,857 B2 | 4/2020 | Sauder et al. |
| 10,729,063 B2 | 8/2020 | Garner et al. |
| 10,743,460 B2 | 8/2020 | Gilbert |
| 10,806,070 B2 | 10/2020 | Garner et al. |
| RE48,572 E | 6/2021 | Garner |
| 11,051,445 B2* | 7/2021 | Hubner ............... A01C 7/0445 |
| 11,058,048 B2 | 7/2021 | Radtke |
| 11,144,775 B2 | 10/2021 | Ferrari et al. |
| 11,202,404 B2 | 12/2021 | Walter et al. |
| 11,277,961 B2 | 3/2022 | Campbell |
| 11,523,554 B2 | 12/2022 | Buehler |
| 11,730,079 B2 | 8/2023 | Wilhelmi |
| 11,785,881 B2 | 10/2023 | Buehler |
| 11,818,977 B2 | 11/2023 | Anderson |
| 11,877,530 B2 | 1/2024 | Barry |
| 11,997,939 B2* | 6/2024 | Gilbert .................. A01C 7/084 |
| 2005/0103244 A1* | 5/2005 | Mayerle .................. A01C 7/06 |
| | | 111/175 |
| 2010/0224110 A1 | 9/2010 | Mariman |
| 2011/0028214 A1 | 2/2011 | Bright et al. |
| 2011/0162566 A1 | 7/2011 | Willhelmi et al. |
| 2011/0271887 A1* | 11/2011 | Shoup .................. A01C 7/046 |
| | | 111/178 |
| 2014/0033972 A1 | 2/2014 | Meyer |
| 2014/0277959 A1* | 9/2014 | Wagers .............. A01C 21/005 |
| | | 701/50 |
| 2015/0223391 A1* | 8/2015 | Wendte .................. A01C 7/04 |
| | | 111/177 |
| 2015/0223392 A1 | 8/2015 | Wilhelmi et al. |
| 2015/0289441 A1* | 10/2015 | Arnett .................. A01C 19/02 |
| | | 111/185 |
| 2015/0289442 A1 | 10/2015 | Heilman |
| 2015/0305229 A1 | 10/2015 | Sauder |
| 2015/0319919 A1 | 11/2015 | Sauder |
| 2015/0351315 A1 | 12/2015 | Wendte |
| 2016/0128269 A1* | 5/2016 | Helmick ................ A01C 7/16 |
| | | 111/185 |
| 2016/0212932 A1 | 7/2016 | Radtke |
| 2016/0227700 A1 | 8/2016 | Wendte et al. |
| 2016/0249525 A1 | 9/2016 | Baurer et al. |
| 2017/0020058 A1 | 1/2017 | Pirkenseer et al. |
| 2017/0034995 A1* | 2/2017 | Wilhelmi ............... A01C 7/20 |
| 2017/0127604 A1* | 5/2017 | Wilhelmi .............. A01C 7/123 |
| 2017/0223947 A1 | 8/2017 | Gall et al. |
| 2017/0332546 A1 | 11/2017 | Garner et al. |
| 2017/0359949 A1 | 12/2017 | Garner et al. |
| 2017/0367255 A1 | 12/2017 | Wilhelmi et al. |
| 2018/0007824 A1 | 1/2018 | Radtke |
| 2018/0249624 A1* | 9/2018 | Gentili .................. A01C 7/046 |
| 2019/0387662 A1 | 12/2019 | Viriat |
| 2020/0053954 A1 | 2/2020 | Hamilton |
| 2020/0352088 A1 | 11/2020 | Arnett et al. |
| 2021/0037699 A1 | 2/2021 | Wilhelmi |
| 2021/0185903 A1 | 6/2021 | Demiter |
| 2021/0212252 A1 | 7/2021 | Wilhelmi |
| 2021/0307236 A1 | 10/2021 | Strnad et al. |
| 2022/0000008 A1 | 1/2022 | Hubner et al. |
| 2022/0061208 A1 | 3/2022 | Campbell |
| 2022/0142041 A1 | 5/2022 | Johnson |
| 2022/0192080 A1 | 6/2022 | Goza |
| 2022/0232753 A1 | 7/2022 | Van De Woestyne et al. |
| 2023/0105245 A1 | 4/2023 | Buehler |
| 2023/0180653 A1 | 6/2023 | Barry |
| 2023/0232732 A1 | 7/2023 | Hartogh |
| 2023/0413720 A1 | 12/2023 | Barry |
| 2024/0032455 A1 | 2/2024 | Buehler |
| 2024/0040955 A1 | 2/2024 | Barry |
| 2024/0315163 A1 | 9/2024 | Gilbert |

FOREIGN PATENT DOCUMENTS

| | | |
|---|---|---|
| BR | 102016002919 A2 | 8/2016 |
| BR | 102015003633 | 2/2021 |
| BR | 102016002919 | 2/2021 |
| CA | 1218266 | 2/1987 |
| CA | 1218266 A | 2/1987 |
| CA | 2408684 A1 | 12/2001 |
| CA | 2213350 C | 7/2002 |
| CA | 2213354 | 7/2002 |
| CA | 2213354 C | 7/2002 |
| CA | 2213703 | 7/2002 |
| CA | 2213703 C | 7/2002 |
| CA | 2213350 | 9/2002 |
| CA | 2830627 C | 9/2012 |
| CA | 2915844 C | 12/2015 |
| CA | 2923713 | 12/2016 |
| CA | 2923713 A1 | 12/2016 |
| CA | 2830627 | 5/2019 |
| CA | 2915844 | 4/2020 |
| CN | 201057704 Y | 5/2008 |
| CN | 206380282 U | 8/2017 |
| CN | 109463081 A | 3/2019 |
| CN | 112601450 A | 4/2021 |
| CZ | 203397 A3 | 11/1997 |
| DE | 389840 | 2/1924 |
| DE | 389840 C | 2/1924 |
| DE | 2011462 | 9/1971 |
| DE | 2011462 A1 | 9/1971 |
| DE | 2826658 | 4/1981 |
| DE | 2826658 A1 | 4/1981 |
| DE | 8400142 | 5/1984 |
| DE | 8400142 U1 | 5/1984 |
| DE | 3405031 | 4/1985 |
| DE | 3405031 C1 | 4/1985 |
| DE | 3826397 A1 | 1/1989 |
| DE | 102017118594 A1 | 2/2019 |
| EP | 47577 A3 | 3/1982 |
| EP | 152048 A2 | 8/1985 |
| EP | 0152048 | 5/1986 |
| EP | 182220 B1 | 5/1986 |
| EP | 0182220 | 4/1990 |
| EP | 606541 A1 | 7/1994 |
| EP | 0606541 | 1/1997 |
| EP | 1461989 B1 | 9/2004 |
| EP | 2688384 | 1/2014 |
| EP | 2832203 B1 | 2/2015 |
| EP | 2911497 | 2/2015 |
| EP | 2911499 | 2/2015 |
| EP | 1461989 | 5/2015 |
| EP | 2911497 B1 | 10/2016 |
| EP | 2911499 B1 | 10/2016 |
| EP | 3108731 | 12/2016 |
| EP | 3108731 A8 | 12/2016 |
| EP | 2688384 B1 | 6/2017 |
| EP | 3219186 A1 | 9/2017 |
| EP | 2901838 B1 | 11/2017 |

(56) References Cited

FOREIGN PATENT DOCUMENTS

| | | |
|---|---|---|
| EP | 3753388 A2 | 12/2020 |
| FR | 1229027 A | 9/1960 |
| FR | 1503687 | 12/1967 |
| FR | 1503687 A | 12/1967 |
| FR | 2414288 | 8/1979 |
| FR | 2414288 A1 | 8/1979 |
| FR | 2490064 A1 | 3/1982 |
| FR | 2591061 | 6/1986 |
| FR | 2591061 A1 | 6/1986 |
| FR | 2574243 | 6/1987 |
| FR | 2574243 A1 | 6/1987 |
| FR | 2678472 A1 | 1/1993 |
| GB | 18381 | 10/1904 |
| GB | 482789 | 4/1938 |
| GB | 989145 | 4/1965 |
| GB | 1136771 A | 12/1968 |
| GB | 2012534 | 8/1979 |
| GB | 2057835 | 4/1981 |
| GB | 2057835 A | 4/1981 |
| GB | 2012534 A | 1/1982 |
| JP | 562481 | 3/1981 |
| JP | S56-24815 U | 3/1981 |
| JP | H11-59886 A | 3/1999 |
| JP | H1159886 | 3/1999 |
| JP | 2007117941 | 5/2007 |
| JP | 2007117941 A | 5/2007 |
| NL | 1005451 | 9/1998 |
| NL | 1005451 C2 | 9/1998 |
| SU | 948316 | 8/1982 |
| SU | 948316 A1 | 8/1982 |
| WO | 9716954 A1 | 5/1997 |
| WO | 9849884 | 11/1998 |
| WO | 1998049884 A1 | 11/1998 |
| WO | 2005011358 | 2/2005 |
| WO | 2005011358 A1 | 2/2005 |
| WO | 2010059101 | 5/2010 |
| WO | 2010124360 | 11/2010 |
| WO | 2013130003 | 9/2013 |
| WO | 2021021594 A1 | 2/2021 |

OTHER PUBLICATIONS

Ag Leader Technology, "Ag Leader SureSpeed Unveiling", Feb. 12, 2020, Publisher: Youtube.

Kinze Manufacturing, "True Speed—3D with Ultra Slow Motion", Feb. 24, 2020, Publisher: YouTube.

"High Speed Planting Solution True Speed", 2020, Publisher: Kinze.

Kinzemanufacturing, "An In-Depth Look into Kinze's True Speed", Feb. 26, 2020, Publisher: YouTube.

Tempo, 2017, Publisher: Vaderstad.

Fundamentals of Machine Operation—Planting, Deere & Co. (Breece et al 1975).

Manual for Deere 495 and 695 planters.

Monosem NG Plus seed meter; 1994 Monosem manual.

Fundamentals of Machine Operation—Planting, Deere & Co. (Breece et al 1981).

John Deere Planter Models 71 Flexi, 495A, 695A.

John Deere Operators Manual 694A, 695A, and 894A Corn Planters (OMB25391 E7).

John Deere 494-A and 495-A Four-row Corn Planters (A1477-62-12-Pltr. (Litho in USA)).

John Deere 7000 and 7100 MaxEmerge Planting Unit, parts catalog.

* cited by examiner

DUAL SEED METER AND RELATED SYSTEMS AND METHODS

CROSS-REFERENCE TO RELATED APPLICATION(S)

This application is a continuation of U.S. patent application Ser. No. 16/752,989, filed Jan. 25, 2020, which claims priority under 35 U.S.C. § 119(e) to U.S. Provisional Application 62/796,641, filed Jan. 25, 2019, and entitled "High Speed Dual Hybrid Seed Meter and Related Systems and Methods," which is hereby incorporated herein by reference in its entirety.

FIELD

The disclosed technology relates generally to devices, systems and methods for use in planting, and in particular, to the devices, methods, and design principles allowing for in-field seed type variation in both normal and high-speed planting implementations. This has implications for high speed, high yield planting of corn, beans and other agricultural crops.

BACKGROUND

As agricultural planting technologies continues to improve, precision agriculture is fast becoming the industry standard. "Precision agriculture," which has been enabled by global positioning system and global navigation satellite system technologies, relates to the ability to control crop input location and variability on a precise, site-specific basis across one or more fields in such a manner as to optimize the return on the inputs while minimizing costs.

Most known dual seed metering systems cannot be combined with high-speed seed delivery systems. More specifically, the known dual seed metering devices are typically not structured to deliver seeds from two or more different sources to a single exchange point at the interface with the seed delivery system. One known high-speed dual seed metering system is limited in its ability to switch between two different types of seed because of a substantial delay. That is, the actuation of the seed type switch in that known system cannot occur in real-time. Instead, once the switch is actuated by a user, the actual change from one seed to another in the system does not occur for a substantial period of time such that the planting system typically travels about 50 to 100 feet before the seeds being placed in the soil actually change from the first type to the second type.

There is a need in the art for improved dual seed metering systems, methods, and devices for in-field seed type variation during a planting operation, including for use in high-speed planting systems.

BRIEF SUMMARY

Discussed herein are various dual seed meter systems that can operate in any type of planting system, including high-speed planting systems, to quickly and easily switch from one seed type to another seed type in real-time, including in the middle of the field without having to stop.

In Example 1, a seed metering system for a row unit of an agricultural machine capable of switching a type of seed being planted as the agricultural machine travels through a field comprises a metering housing, a first seed disk rotatably disposed within the metering housing, the first rotatable seed disk comprising a plurality of first openings arranged along a first curved path, and a second seed disk rotatably disposed within the metering housing, the second rotatable seed disk comprising a plurality of second openings arranged along a second curved path, wherein the first and second seed disks overlap at the first and second openings to form a convergence region, wherein each seed traveling along the first or second curved path is delivered to a single point.

Example 2 relates to the seed metering system according to Example 1, wherein the single point is a single release point.

Example 3 relates to the seed metering system according to Example 2, further comprising a seed delivery channel coupled to the metering housing such that the single release point is in communication with the seed delivery channel.

Example 4 relates to the seed metering system according to Example 1, further comprising a vacuum chamber defined between a first wall of the metering housing and the first and second seed disks, and a seed chamber defined between a second wall of the metering housing and the first and second seed disks.

Example 5 relates to the seed metering system according to Example 1, wherein a rotational axis of the first seed disk is parallel to and non-concentric with a rotational axis of the second seed disk.

Example 6 relates to the seed metering system according to Example 1, wherein the seed metering system is a high speed metering system.

Example 7 relates to the seed metering system according to Example 1, wherein the metering housing comprises a first seed disk chamber defined within the metering housing, wherein the first seed disk chamber is sized and shaped to receive the first seed disk, and a second seed disk chamber defined within the metering housing, wherein the second seed disk chamber is sized and shaped to receive the second seed disk.

In Example 8, a seed metering system for a row unit of an agricultural machine capable of switching a type of seed being planted as the agricultural machine travels through a field comprises a metering housing, a first seed disk rotatably disposed within the metering housing, the first rotatable seed disk comprising a plurality of first openings arranged along a first curved path, a second seed disk rotatably disposed within the metering housing, the second rotatable seed disk comprising a plurality of second openings arranged along a second curved path, a convergence region disposed where the first and second seed disks overlap at the first and second openings, the convergence region comprising a single point, wherein each seed transported along the first or second curved path is delivered to the single point, a vacuum chamber defined between a first wall of the metering housing and the first and second seed disks, and a seed chamber defined between a second wall of the metering housing and the first and second seed disks.

Example 9 relates to the seed metering system according to Example 8, wherein the single point is a single release point.

Example 10 relates to the seed metering system according to Example 9, further comprising a seed delivery channel coupled to the metering housing such that the single release point is in communication with the seed delivery channel.

Example 11 relates to the seed metering system according to Example 8, wherein the metering housing comprises a first seed disk chamber defined within the metering housing, wherein the first seed disk chamber is sized and shaped to receive the first seed disk, and a second seed disk chamber defined within the metering housing, wherein the second seed disk chamber is sized and shaped to receive the second seed disk.

Example 12 relates to the seed metering system according to Example 11, wherein a rotational axis of the first seed disk is parallel to and non-concentric with a rotational axis of the second seed disk.

Example 13 relates to the seed metering system according to Example 8, wherein the seed metering system is a high speed metering system.

Example 14 relates to the seed metering system according to Example 8, further comprising a first seed feeding line coupled to the metering housing, wherein the first seed feeding line is in communication with the seed chamber and the first seed disk, and a second seed feeding line coupled to the metering housing, wherein the second seed feeding line is in communication with the seed chamber and the second seed disk.

In Example 15, a seed metering system for a row unit of an agricultural machine capable of switching a type of seed being planted as the agricultural machine travels through a field comprises a metering housing comprising first and second seed disk chambers defined within the metering housing, a first seed disk rotatably disposed within the first seed disk chamber, the first rotatable seed disk comprising a plurality of first openings defined in an outer edge of the first seed disk, wherein the plurality of first openings follow a first curved path during rotation of the first seed disk, a second seed disk rotatably disposed within the second seed disk chamber, the second rotatable seed disk comprising a plurality of second openings defined in an outer edge of the second seed disk, wherein the plurality of second openings follow a second curved path during rotation of the second seed disk, a convergence region disposed where the first and second curved paths intersect, the convergence region comprising a single release point, wherein each seed transported along the first or second curved path is transported to and released at the single release point, a vacuum chamber defined between a first wall of the metering housing and the first and second seed disks, and a seed chamber defined between a second wall of the metering housing and the first and second seed disks.

Example 16 relates to the seed metering system according to Example 15, further comprising a seed delivery channel coupled to the metering housing such that the single release point is in communication with the seed delivery channel, a first seed feeding line coupled to the metering housing, wherein the first seed feeding line is in communication with the seed chamber and the first seed disk, and a second seed feeding line coupled to the metering housing, wherein the second seed feeding line is in communication with the seed chamber and the second seed disk.

Example 17 relates to the seed metering system according to Example 15, wherein the first and second seed disks overlap at the outer edge of the first seed disk and the outer edge of the second seed disk such that each of the plurality of first openings and the plurality of second openings align to form a single combined opening during rotation of the first and second seed disks.

Example 18 relates to the seed metering system according to Example 15, further comprising a first vacuum channel defined in the vacuum chamber, wherein the first vacuum channel is adjacent to the first curved path, and a second vacuum channel defined in the vacuum chamber, wherein the second vacuum channel is adjacent to the second curved path.

Example 19 relates to the seed metering system according to Example 18, wherein the first and second vacuum channels define the convergence region.

Example 20 relates to the seed metering system according to Example 15, further comprising a first seed receptacle defined in the seed chamber, wherein the first seed receptacle is in communication with the first seed disk, and a second seed receptacle defined in the seed chamber, wherein the second seed receptacle is in communication with the second seed disk.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

Known precision technologies have created the need for systems and devices that provide for planting more than one seed type in a field. The various embodiments herein relate to seed meter devices that include dual meter plates that function collaboratively to allow for real-time selection of one of two types of seeds during planting. It is understood that the various dual seed meter system implementations disclosed or contemplated herein can be incorporated into any known planting or seeding machine, such as, but not limited to, row crop planters, grain drills, air seeders, etc.

Figure 1A:
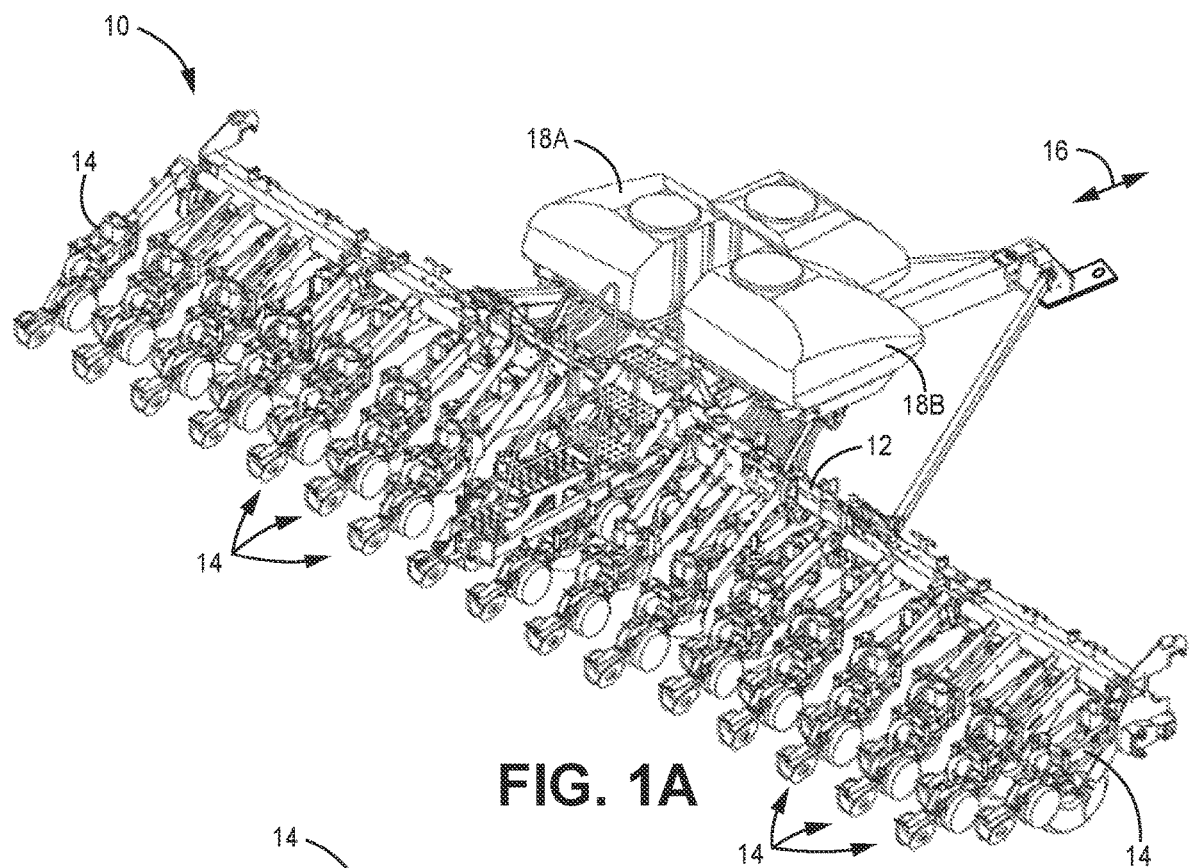
FIG. 1A is a perspective view of a seeding machine, according to one embodiment.

FIG. 1A depicts an exemplary planter or seeding machine 10 that, according to one embodiment, can have a dual seed metering system as disclosed or contemplated herein. The planting machine 10 in this specific implementation is a row crop planter 10 having a central crossbar 12 and multiple planting row units 14 mounted to the crossbar 12. At least two hoppers (also referred to herein as "storage tanks") 18A, 18B on the seeding machine 10 hold at least two different types of seed and are fluidically coupled to unit hoppers (also referred to as "mini-hoppers") (such as hopper 34 as discussed below) on each planting unit 14 such that seed can be delivered pneumatically from one of the hoppers 18 to a unit hopper (such as hopper 34) on each unit 14. Alternatively, any known hopper or seed retention device configuration can be incorporated into the planter 10 and the separate units 14 and function with the dual seed metering system embodiments herein. It is understood that, generally, the row units 14 on a particular planter (such as exemplary planter 10) are typically identical or substantially similar. The seeding machine 10 moves forward and backward via the fore-aft direction shown by the arrow 16.

Figure 1B:
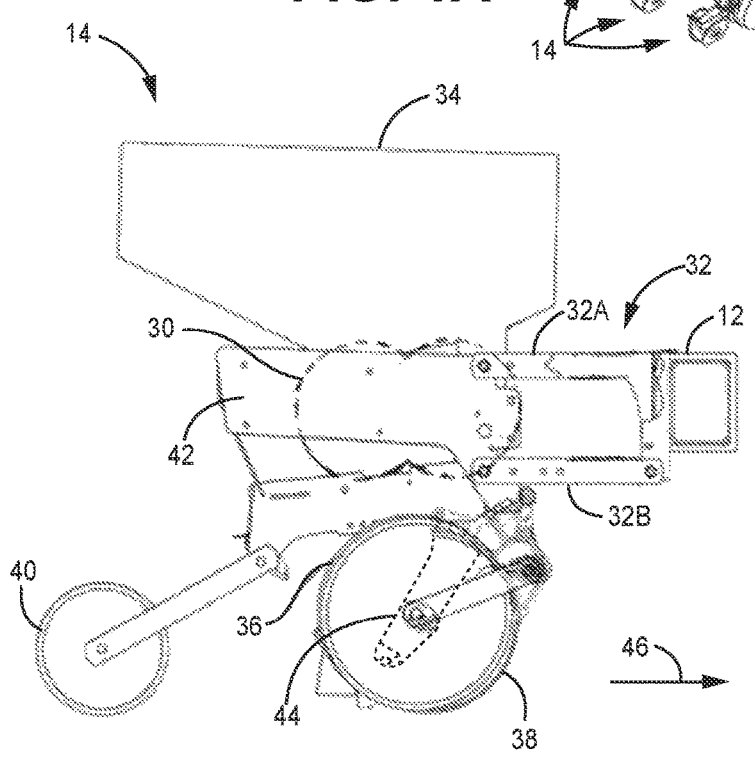
FIG. 1B is a side view of a row unit of a seeding machine, according to one embodiment.

One example of a row unit 14 having a dual seed metering system 30, according to one embodiment, is depicted in greater detail in FIG. 1B. It is understood that any dual seed metering system according to any embodiment disclosed or contemplated herein (such as system 30) can be incorporated into any known row unit having any configuration, and that any such row unit 14 can be incorporated into any known seeding machine. This particular exemplary row unit 14 is jointedly coupled to the central crossbar 12 via a parallelogram linkage 32 made up of two linkage arms 32A, 32B such that the individual units 14 are vertically moveable by a predetermined amount relative to the crossbar 12. The exemplary row unit 14 in this implementation has known components, including a hopper 34, gauge wheels 36 (controlling the depth of the furrow), furrow opening disks 38 (to form an open furrow in the soil beneath the seeding machine into which seed is deposited), and a closing and packing wheel 40 (to close the furrow over the deposited seed and to firm the soil in the closed furrow), as are generally understood in the art. Alternatively, any known components or features can be incorporated into the row units 14. According to certain embodiments, the hopper 34 is made up of at least two hoppers. For example, in one implementation, the hopper 34 is made up of two seed hoppers and a chemical hopper, such that each of the two seed hoppers contain a different type of seed and the chemical hopper can contain a herbicide, insecticide, or any other known chemical for application while planting, including any combination thereof. In this implementation, the seed metering system 30 is disposed on the row unit 14, and more specifically, coupled to the frame member 42 thereof, such that it can be in operably communication with the hopper 34 and the seed delivery system 44. The frame member 42 is jointedly coupled to the parallelogram linkage 32. Two types of seed are stored or retained in two hoppers (not shown) in seed hopper 34 and provided to the seed meter 30. From the seed meter system 30, the seed is carried by the delivery system 44 into a planting furrow, or trench, formed in the soil by furrow openers 38. It is understood that the dual seed metering system embodiments as disclosed or contemplated herein (including system 30) can be coupled to and operate with any known seed delivery system. The crossbar 12 and row unit 14 are designed to be moved over the ground in a forward working direction identified by arrow 46.

Figure 2A:
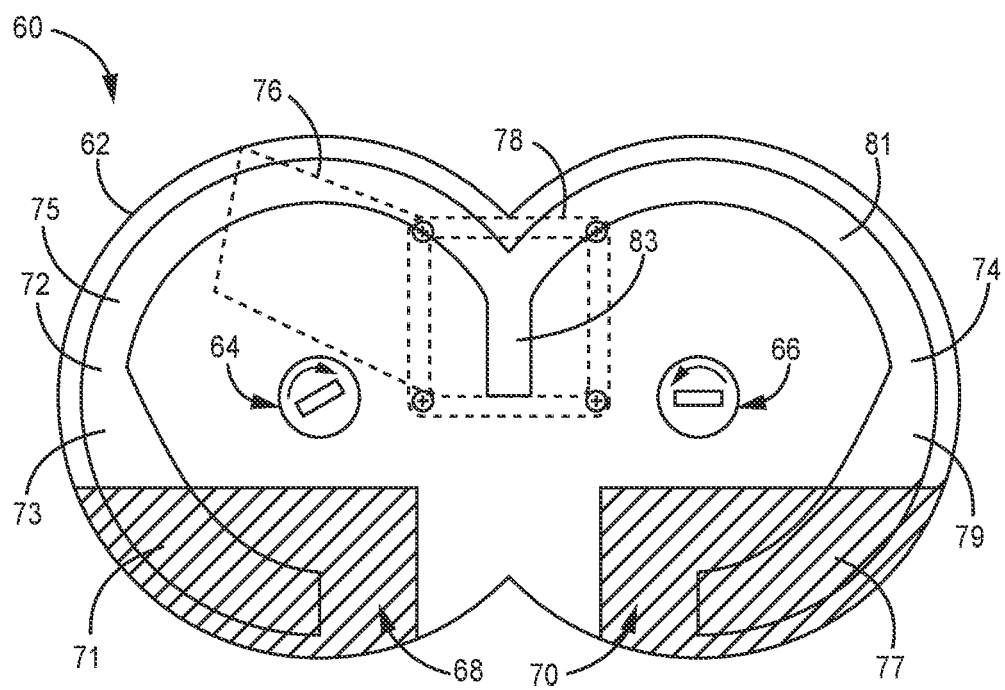
FIG. 2A is a cross-sectional side view of a seed meter system, according to one embodiment.
Figure 2B:
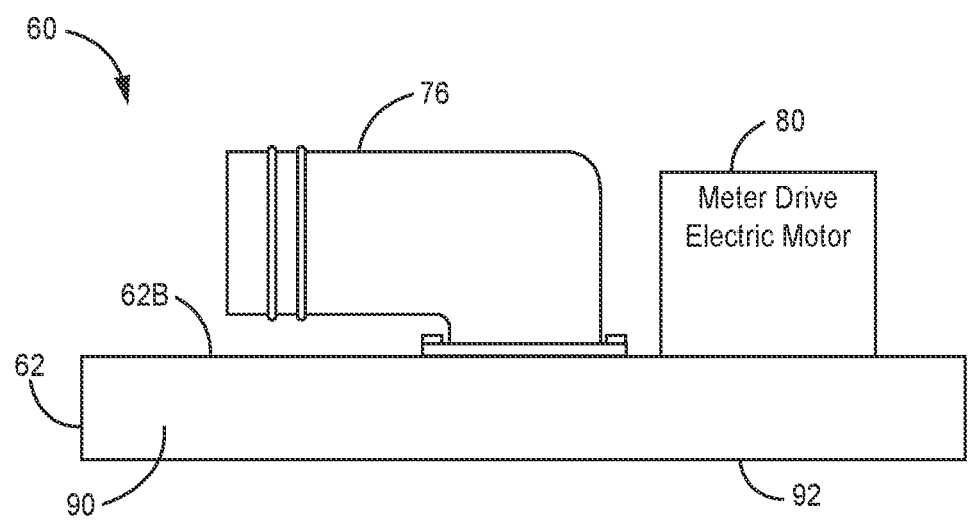
FIG. 2B is a top view of a portion of the seed meter system of FIG. 2A, according to one embodiment.
Figure 2C:
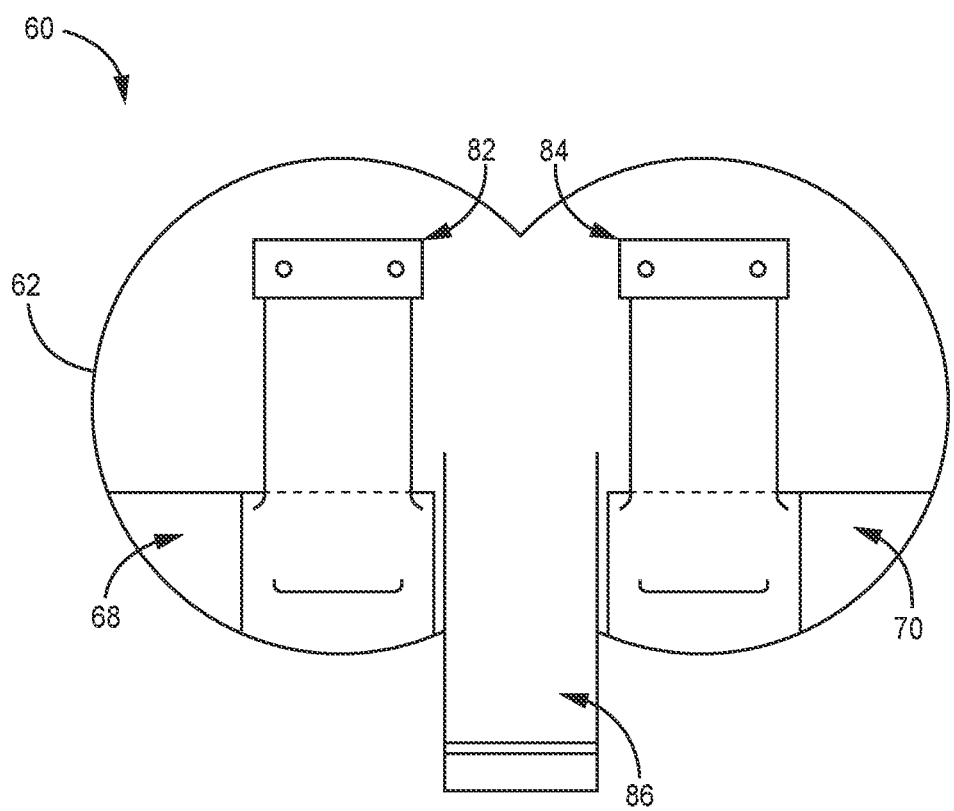
FIG. 2C is a cross-sectional side view of another portion of the seed meter system of FIG. 2A, according to one embodiment.
Figure 2D:
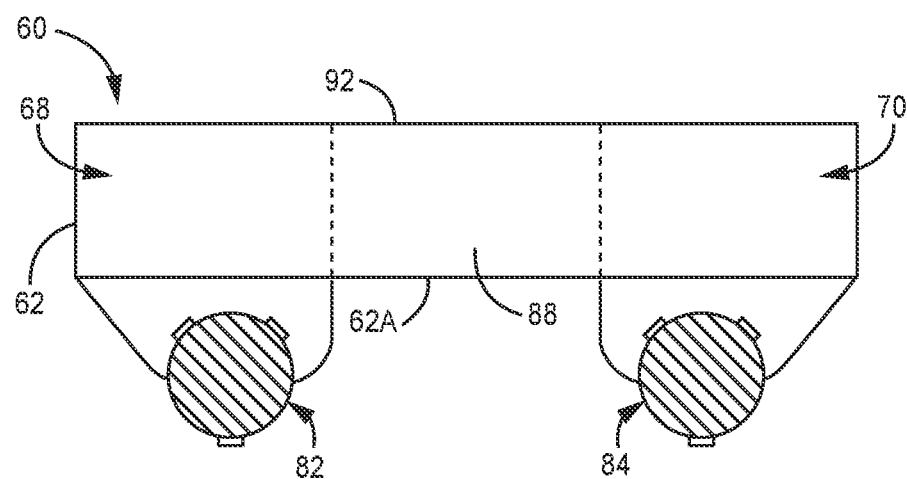
FIG. 2D is a top view of another portion of the seed meter system of FIG. 2A according to one embodiment.

One seed meter system embodiment 60 is shown in FIGS. 2A-2D. Note that the seed plates are not shown in FIG. 2A or 2C to better depict the other components of the system 60. As best shown in FIGS. 2A and 2B, the system 60 includes a housing 62, a first seed plate drive 64, a second seed plate drive 66, a first seed receptacle 68, a second seed receptacle 70, a first vacuum channel 72 defined in the housing 62, a second vacuum channel 74 defined in the housing 62, a vacuum duct 76, a vacuum port 78 at one end of the duct 76 providing for the inner lumen of the duct 76 to be in fluidic communication with an interior of the housing 62, and a drive motor 80 associated with the housing 62. In addition, as best shown in FIGS. 2C and 2D, the system 60 also has a first seed feeding line 82, a second seed feeding line 84, and a seed delivery channel 86. According to one embodiment, the seed delivery channel 86 is simply a channel or tube that allows for the seed exiting the dual meter system 60 to drop as a result of gravity. Alternatively, any known seed delivery system can be coupled to the system 60 at the channel 86 or can replace the channel 86. For example, in one embodiment, the channel 86 is replaced with a seed delivery belt similar to the belt 198 depicted in FIG. 5B and discussed below.

The housing 62 is sized and shaped to receive two metering plates, which will be discussed in further detail below. As best shown in FIG. 2A, the first seed plate drive 64 is disposed within the housing 62 such that it can drive the first plate (not shown), while the second seed plate drive 66 is disposed within the housing 62 such that it can drive the second plate (not shown). The first and second drives 64, 66 are operably coupled to the motor 80 (as best shown in FIG. 2B) via any known fashion such that the motor 80 drives the first and second drives 64, 66, which rotate the metering plates (not shown). It is understood that the actuator 80 can be any type of actuator 80, and in those embodiments in which the actuator 80 is a motor 80, it can be any type of motor 80. Alternatively, two motors can be provided, with each motor actuating a separate one of the two drives 64, 66. In a further embodiment, any known actuation mechanism(s) or component(s) can be used.

As best shown in FIGS. 2B and 2D (and as discussed in additional detail below with respect to FIGS. 3F and 3G according to another embodiment), the two seed plates 92 are disposed within the housing 62 such that the plates 92 divide the housing 62 into two separate chambers. As best shown in FIG. 2D, the seed chamber 88 is defined by the first housing wall 62A (on the same side as the seed feeding lines 82, 84) and the seed plates 92. Further, as best shown in FIG. 2B, the vacuum chamber 90 is defined by the second housing wall 62B (on the same side as the vacuum duct 76 and vacuum port 78) and the seed plates 92.

The first seed feeding line 82 as depicted in FIGS. 2C and 2D is in fluidic communication with the first seed receptacle 68 and the hopper (such as hopper 34 discussed above, for example) such that a first seed type is delivered from the hopper (not shown) to the first seed receptacle 68 via the first seed feeding line 82. Similarly, the second seed feeding line 84 is in fluidic communication with the second seed receptacle 70 and the hopper (not shown) such that a second seed type is delivered from the hopper (not shown) to the second seed receptacle 70 via the second seed feeding line 84. The first and second seed receptacles 68, 70 are disposed within the seed chamber 88.

Returning to FIG. 2A, the first vacuum channel 72 has a seed collection region 71, a narrowing region 73, and a single seed transport region 75. The channel 72 and its three regions 71, 73, 75 are defined in the vacuum chamber 90 as best shown in FIG. 2B. The seed collection region 71 of the vacuum channel 72 has a first, relatively wider width along the portion of the channel 72 that is disposed adjacent to the first seed receptacle 68 in the seed chamber 88 (as best shown in FIG. 2D) but on the opposite side of the seed plates 92 relative to the first seed receptacle 68. As such, the vacuum created in the seed collection region 71, which is disposed in the vacuum chamber 90, results in a vacuum being created in the notches of the seed plate 92 disposed therebetween, as will be described in further detail below. The vacuum created across the notches in the seed plate 92 causes seeds to be urged into contact with the seed plate 92 at the notches with sufficient force to hold the seeds in contact with the plate 92 as the plate 92 rotates, thereby transporting the seed from the first seed receptacle 68. In the narrowing region (also referred to as a "crowding region" or "crowding zone") 73, the width of the channel 72 narrows along the length of the channel 72 between the seed collection region 71 and the single seed transport region 75. Further, the width of the channel 72 along the single seed transport region 75 is a relatively uniform width that is narrower than the seed collection region 71 and is generally only wide enough to apply a vacuum across the plate 92 to retain a single seed on the side of the plate 92 opposite the channel 72.

Similarly, the second vacuum channel 74 has a seed collection region 77, a narrowing region 79, and a single seed transport region 81. The channel 74 and its three regions 77, 79, 81 are defined in the vacuum chamber 90 as best shown in FIG. 2B. The seed collection region 77 has a first, relatively wider width along the portion of the channel 74 that is disposed adjacent to the second seed receptacle 70 but on the opposite side of the seed plates 92. As such, in a similar fashion to the first vacuum channel 72, the vacuum created in the seed collection region 77, which is disposed in the vacuum chamber 90, results in a vacuum being created in the notches of the seed plate 92 disposed therebetween, as will be described in further detail below. In the narrowing region (also referred to as a "crowding region" or "crowding zone") 79, the width of the channel 74 narrows along the length of the channel 74 between the seed collection region 77 and the single seed transport region 81. Further, the width of the channel 74 along the single seed transport region 81 is a relatively uniform width that is narrower than the seed collection region 77 and is generally only wide enough to apply a vacuum across the plate 92 to retain a single seed on the side of the plate 92 opposite the channel 74.

Further, the two vacuum channels 72, 74 converge at a convergence region (or "convergence zone") 83 (as best shown in FIG. 2A) such that both vacuum channels 72, 74 are in fluidic communication with the convergence region 83. As a result, any seeds transported along the two seed paths from the seed receptacles 68, 70 via first and second seed plates (such as seed plates 100, 102 as discussed below, for example) are ultimately urged by the two seed plates disposed within the housing 62 into the convergence region 83, as discussed in further detail below.

As discussed in additional detail below, the vacuum convergence region 83 in the vacuum chamber 90 retains the seeds in place on the plates 92 at the seed convergence region (not shown) in the seed chamber 88 as the seeds are urged toward the interface with the seed delivery channel 86. As such, the seeds transported along the seed convergence region in the seed chamber 88 can pass from the region into the seed delivery channel 86. More specifically, in certain embodiments, the convergence region 83 in the seed chamber 88 has an opening (not shown) at its distal end that is in communication with the seed delivery channel 86 such that each seed is transported through the convergence region and through the opening and into the seed delivery channel 86.

Figure 3A:
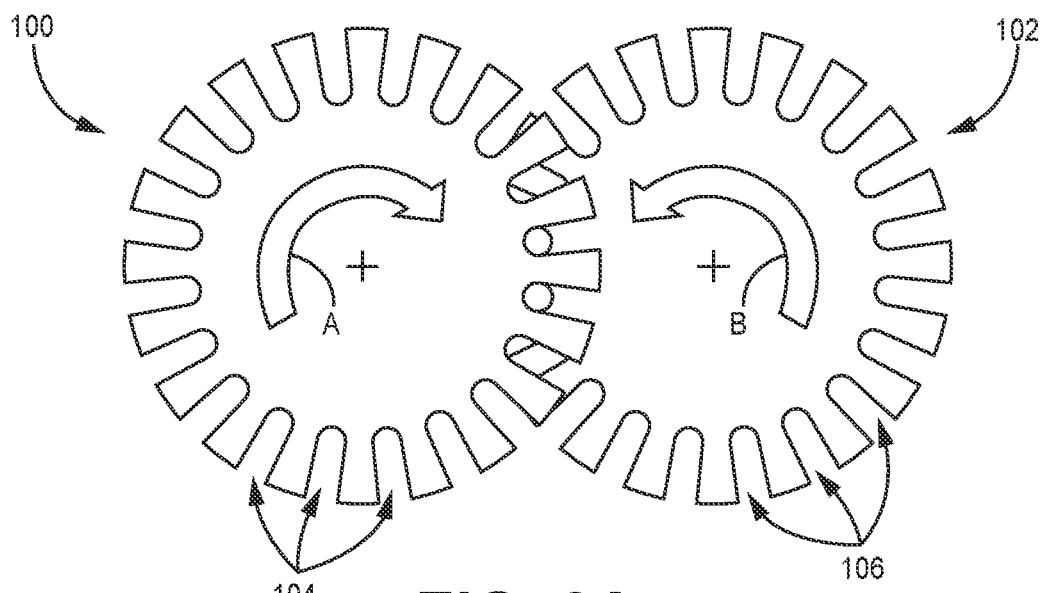
FIG. 3A is a side view of first and second seed plates for use in a seed meter system, according to one embodiment.
Figure 3B:
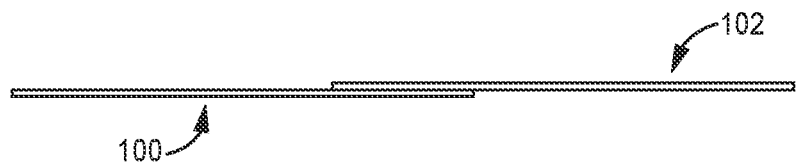
FIG. 3B is a top view of the first and second seed plates of FIG. 3A, according to one embodiment.

One embodiment of the first and second seed plates (or "disks") 100, 102 in a seed metering housing 108 are depicted in FIGS. 3A-3G. Each plate 100, 102 is a relatively thin plate 100, 102 (as best shown in FIG. 3B) that has seed notches 104, 106 defined around the outer circumference of the plate 100, 102, as best shown in FIG. 3A. That is, the seed notches 104, 106 are defined along an outer periphery of the plates 100, 102. More specifically, the first plate 100 has seed notches 104 and the second plate 102 has seed notches 106. Each of the seed notches 104, 106 is sized to allow a portion of a single seed to be disposed against and partially within the notch 104, 106 during use, as will be described in further detail below. More specifically, each notch 104, 106 is an opening 104, 106 that has a width that is less than the width of a seed, thereby preventing any seed from passing through the notch 104, 106. However, each notch 104, 106 is large enough such that the vacuum created through each notch 104, 106 allows for positioning of a seed partially into the notch 104, 106, thereby retaining the seed in place as the plates 100, 102 rotate.

According to one embodiment, each of the seed plates 100, 102 has a thickness ranging from about 0.25 mm to about 1.25 mm. Alternatively, the thickness can range from about 0.5 mm to about 1 mm. In a further alternative, the thickness can range from about 0.5 mm to about 0.75 mm. It is understood that the plates 100, 102 can be made of any known material that is used for known seed plates. In certain implementations, the material is a substantially rigid material. It is understood that any of the seed plates according to any embodiment herein can have the same or similar features and/or characteristics.

Figure 3C:
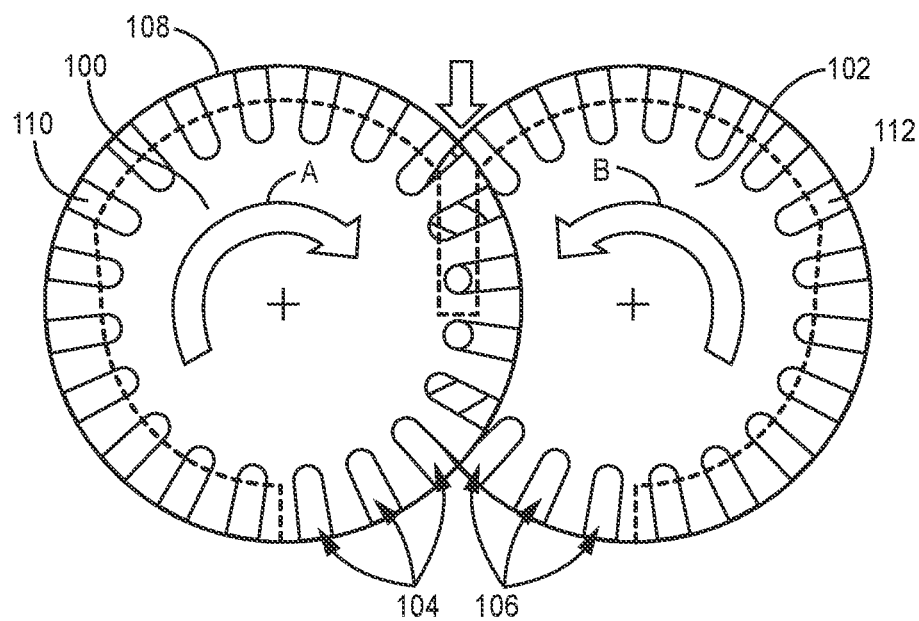
FIG. 3C is a cross-sectional side view of a portion of a seed meter system containing the first and second seed plates of FIG. 3A, according to one embodiment.

The two seed plates 100, 102, according to one embodiment, are disposed next to each other in the metering housing 108 in an overlapping fashion such that a portion of the outer circumference of the first plate 100 overlaps with a portion of the outer circumference of the second plate 102. Further, as best shown in FIGS. 3F and 3G, the two seed plates 100, 102 are disposed within the housing 108 such that the housing 108 is divided into a seed chamber 148 and a vacuum chamber 150 in a fashion similar to the chambers 88, 90 discussed above. Further, the seed notches 104 of the first plate 100 are in fluidic communication with the first vacuum channel 110 (as best shown in FIG. 3C) defined in the housing 108 (similar to the vacuum channel 72 discussed above) while the seed notches 106 of the second plate 102 are in fluidic communication with the second vacuum channel 112 defined in the housing 108 (similar to the vacuum channel 74 discussed above).

Figure 3D:
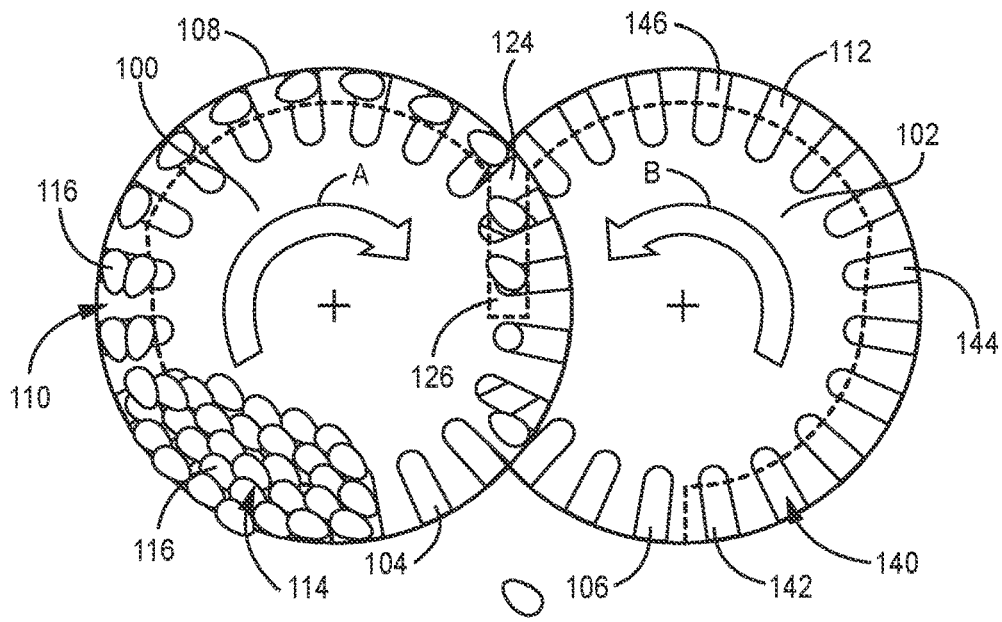
FIG. 3D is a cross-sectional side view of the seed meter system containing the first and second seed plates of FIG. 3A, according to one embodiment.
Figure 3E:
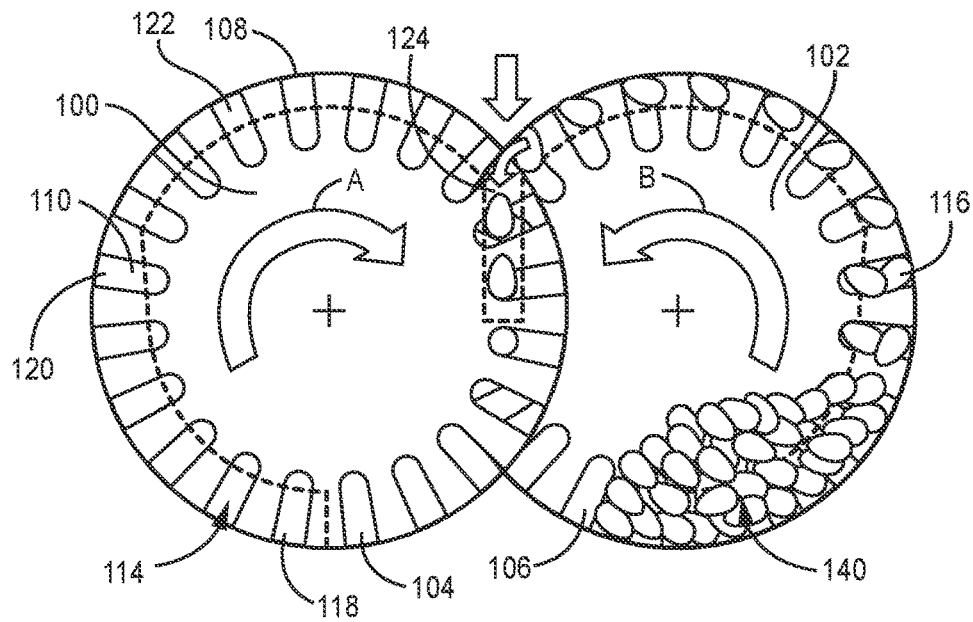
FIG. 3E is a cross-sectional side view of the seed meter system containing the first and second seed plates of FIG. 3A, according to one embodiment.
Figure 3F:
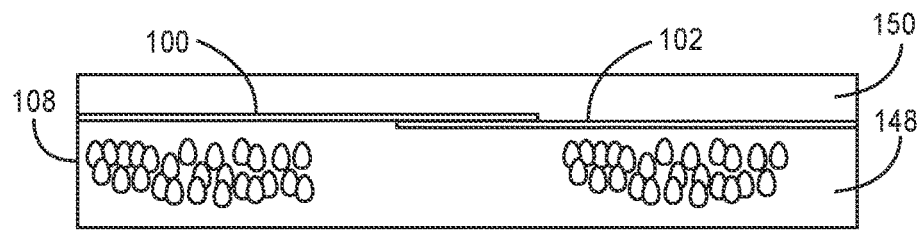
FIG. 3F is a cross-sectional top view of the seed meter system containing the first and second seed plates of FIG. 3A, according to one embodiment.
Figure 3G:
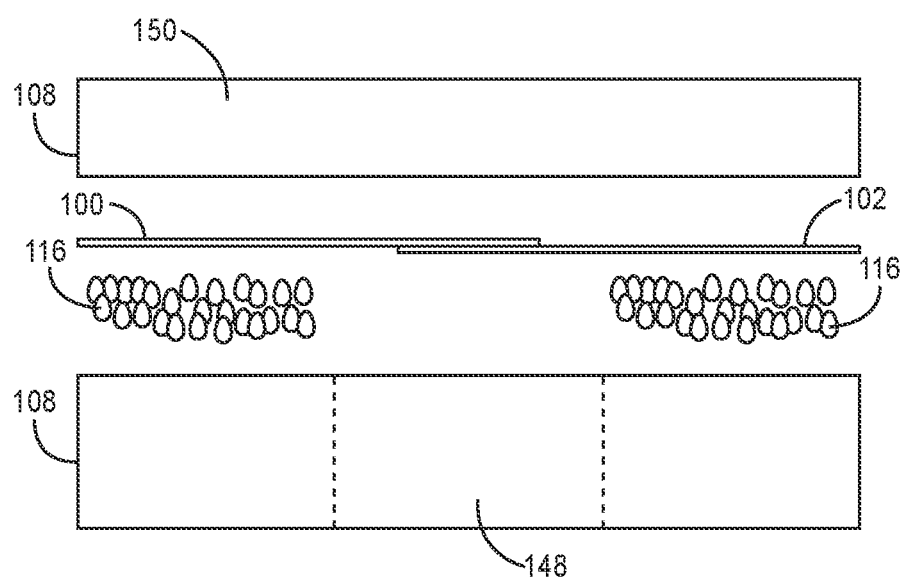
FIG. 3G is an exploded top view of the seed meter system containing the first and second seed plates of FIG. 3A, according to one embodiment.

In use as best shown in FIGS. 3D and 3E and in a fashion similar to the seed metering system 60 described above, each of the notches 104, 106 is sized such that at least one, but as many as two or three, seeds can be collected on each notch 104, 106 as a result of the vacuum. Further, each such notch 104, 106 transports those seeds along the path of the notches 104, 106 opposite the vacuum channels 110, 112 as the plates 100, 102 rotate in the directions of the arrows A, B as shown and the notches 104, 106 pass through the seed receptacles 114, 140 and then along the channels 110, 112.

More specifically, as best shown in FIG. 3D, the first plate 100 rotates in the clockwise direction as shown by arrow A such that the notches 104 pass through the first seed receptacle 114. As a result, seeds 116 are pulled toward and partially into each notch 104 by the vacuum created on the opposite side of the plate 100 (in the vacuum chamber 150) and retained therein via the pressure differential created by the vacuum in the vacuum chamber 150. It is understood that the vacuum applied in the vacuum chamber 150 can be created via any known fashion (such as, for example, a vacuum duct similar to the vacuum duct 76 described above). As the first plate 100 rotates, each seed 116 is urged into each notch 104 by the vacuum and further is urged out of the first seed receptacle 114 by the rotation of the plate 100, as best shown in FIG. 3D. As the seed is urged along the path of the notches 104 in the seed chamber 148, the vacuum applied to the notches 104 on the opposite side of the plate 100 (in the vacuum chamber 150) is influenced by the characteristics of the vacuum channel 110. That is, as the notch 104 passes next to the narrowing region 120, the area of the notch 104 to which the vacuum is applied is reduced to the width of the narrowing region 120. Further, as the notch 104 moves past the narrowing region 120 and starts to move past the single seed transport region 122 of the first channel 110, the area of the notch 104 to which the vacuum is applied is further reduced to a width that is substantially equal to or less than the width of a seed, thereby causing any additional seeds disposed on the notch 104 to drop off, such that each notch 104 has only one seed 116. That is, as discussed in detail above, the width of the narrowing region 120 narrows along the path that the notches 104 travel from the seed collection region 118 to the single seed transport region 122 such that ultimately the width of the channel 110 is substantially equal to or less than the width of each seed 116 in the single seed transport region 122. As such, the narrowing of the channel 110 in the narrowing region 120 causes all but one seed 116 to drop from the notch 104, thereby ensuring that there is only one seed 116 in each notch 104 as the seeds 116 continue to be urged along the path of the notches 104 as shown. Ultimately, each seed 116 is urged via a notch 104 along the path of the notch 104 adjacent to the first vacuum channel 110 toward and into the seed convergence region 124 in the seed chamber 148. In the convergence region 124, each seed 116 is transported to the distal end of the convergence region 124 via a notch 104, where the seed 116 reaches the point where the channel 110 on the opposing side of the plates 100, 102 ends at the distal end 126 of the channel 110 such that the vacuum applied to the seed 116 is removed and the seed 116 is released, thereby dropping into the seed delivery channel (not shown), which can be similar to the seed delivery channel 86 discussed above or is any known seed delivery apparatus or system.

Similarly, as best shown in FIG. 3E, the second plate 102 rotates in the counterclockwise direction as shown by arrow B such that the notches 106 pass through the second seed receptacle 140. As a result, seeds 116 are pulled toward and partially into each notch 106 by the vacuum created on the opposite side of the plate 102 (in the vacuum chamber 150) and retained therein via the pressure differential created by the vacuum in the vacuum chamber 150, as discussed above.

As the second plate 102 rotates, each seed 116 is urged into each notch 106 by the vacuum and further is urged out of the second seed receptacle 140 by the rotation of the plate 102. As a result of the narrowing feature of the narrowing region 144 similar to the narrowing region 120 as discussed above, all but one seed 116 is dropped from the notch 106, thereby ensuring that there is only one seed 116 in each notch 106 as the seeds 116 continue to be urged along the path of the notches 106 as shown. Ultimately, each seed 116 is urged via a notch 106 along the path of the notch 106 adjacent to the second vacuum channel 110 toward and into the seed convergence region 124 in the seed chamber 148. As with seeds 116 delivered to the convergence region 124 via the first plate 100, in the convergence region 124, each seed 116 is transported to the distal end of the convergence region 124 via a notch 106, where the seed reaches the distal end 126 of the channel 110 and thus is released into the seed delivery channel (not shown) or other type of seed delivery apparatus or system.

Thus, in this embodiment and every other embodiment disclosed or contemplated herein, each seed 116 is urged toward and into the same location: the convergence region 124 and thus the seed delivery channel (not shown). More specifically, regardless of whether the seed 116 is delivered via a notch 104 in seed plate 100 along the seed path created by the plate 100 or via a notch 106 in seed plate 102 along the seed path created by the plate 102, each seed is delivered into the seed convergence region 124 and to the same exact X,Y,Z coordinate where the distal end 126 of the channel 110 is located. This feature is present in every dual seed meter embodiment disclosed or contemplated herein.

FIGS. 3F and 3G provide a top view of the seed meter housing 108, with the seed plates 100, 102 disposed in the housing 108 to divide the housing 108 into the seed chamber 148 and the vacuum chamber 150. FIG. 3F depicts an enclosed housing 108, according to one embodiment, while FIG. 3G depicts a semi-exploded view of the various components of the housing 108.

Figure 4A:
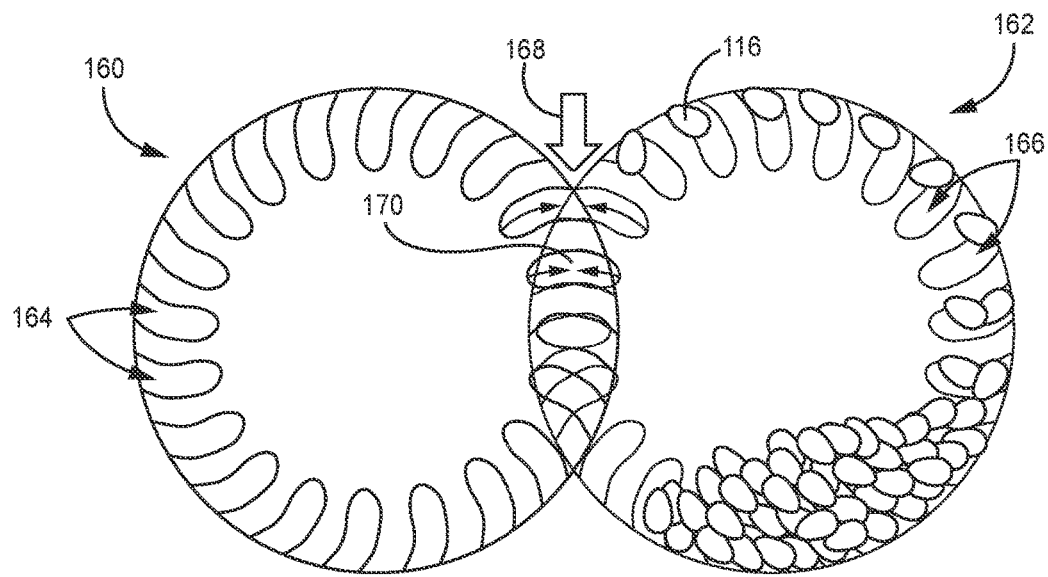
FIG. 4A is a cross-sectional side view of first and second seed plates in a seed meter system, according to another embodiment.
Figure 4B:
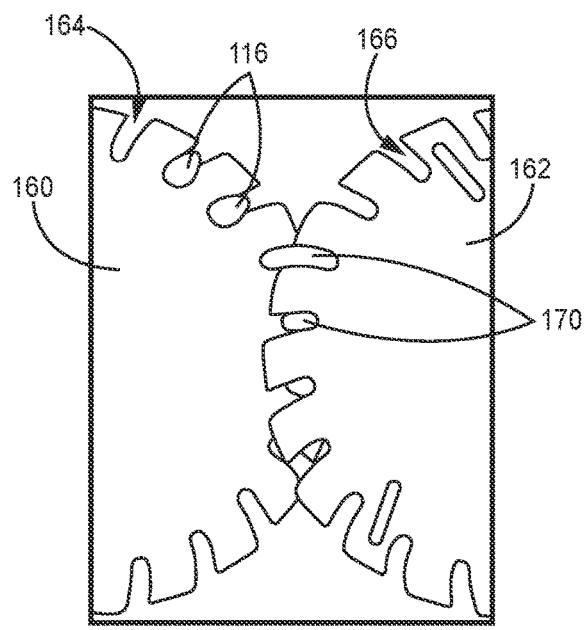
FIG. 4B is a side view of a portion of the first and second seed plates of FIG. 4A, according to one embodiment.
Figure 4C:
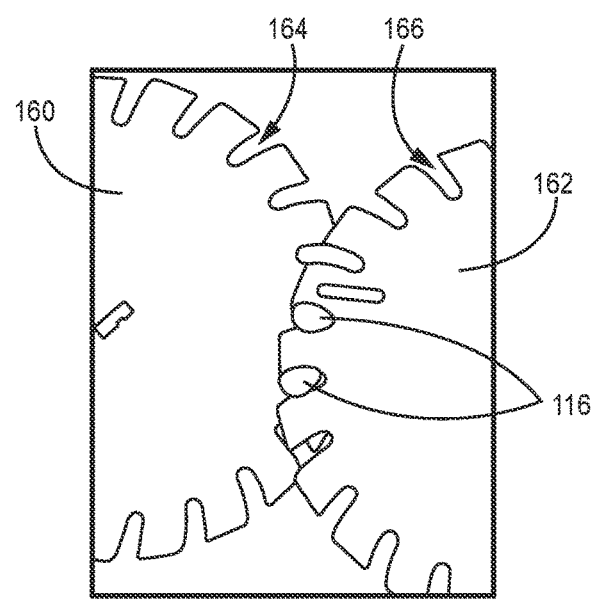
FIG. 4C is a side view of a portion of the first and second seed plates of FIG. 4A, according to one embodiment.

An alternative embodiment of first and second seed plates 160, 162 are depicted in FIGS. 4A-4C. Each plate 160, 162 in this implementation can have substantially the same characteristics, features, and components as the plates 100, 102 described, except as described herein. Each of these plates 160, 162 has seed notches 164, 166 defined around the outer circumference of the plate 160, 162. That is, the seed notches 164, 166 are defined along an outer periphery of the plates 160, 162. The seed notches 164, 166 are sized to receive a portion of a single seed therein during use (such that the width of each notch is less than the width of any seed intended to be used with the embodiments herein), in a fashion similar to the plates 100, 102 described above. However, in this specific embodiment, the notches 164, 166 are curved notches 164, 166 as shown to provide a smoother transport of seeds (such as seeds 116, for example) at the overlapping of the two plates 160, 162. That is, the curved notches 164, 166 are curved toward the direction of rotation of the plates 160, 162. More specifically, the curved notches 164 of the first plate 160 are curved toward the direction of rotation of the first plate 160, which is clockwise, while the curved notches 166 of the second plate 162 are curved toward the direction of rotation of the second plate 162, which is counterclockwise. As such, at the point of overlap 168 of the two plates 160, 162, the two notches 164, 166 that overlap are aligned to create a combination seed cell 170 formed by the overlap of the two notches 164, 166 to form an opening in fluid communication with the vacuum chamber 90 such that the seed 116 positioned in one of the notches 164, 166 is urged toward the vacuum chamber 90 as a result of the vacuum applied therein, thereby making the seed 116 unlikely to be knocked out of the notch 164, 166 by the other plate 160, 162.

In use as best shown in FIGS. 4B and 4C, the seeds 116 are disposed in the notches 164 of the first plate 160 (and could also be disposed in the notches 166 of the plate 162, obviously) and are urged toward the overlap region in which the combination seed cells 170 are created. The curved configuration of the curved notches 166 ensure that the overlap of the two notches 164, 166 to form the combination seed cell 170 (with the vacuum chamber 90) is substantially uniform such that the seeds are less likely to be knocked out of the notches 164, 166 as the overlap or convergence occurs.

Figure 5A:
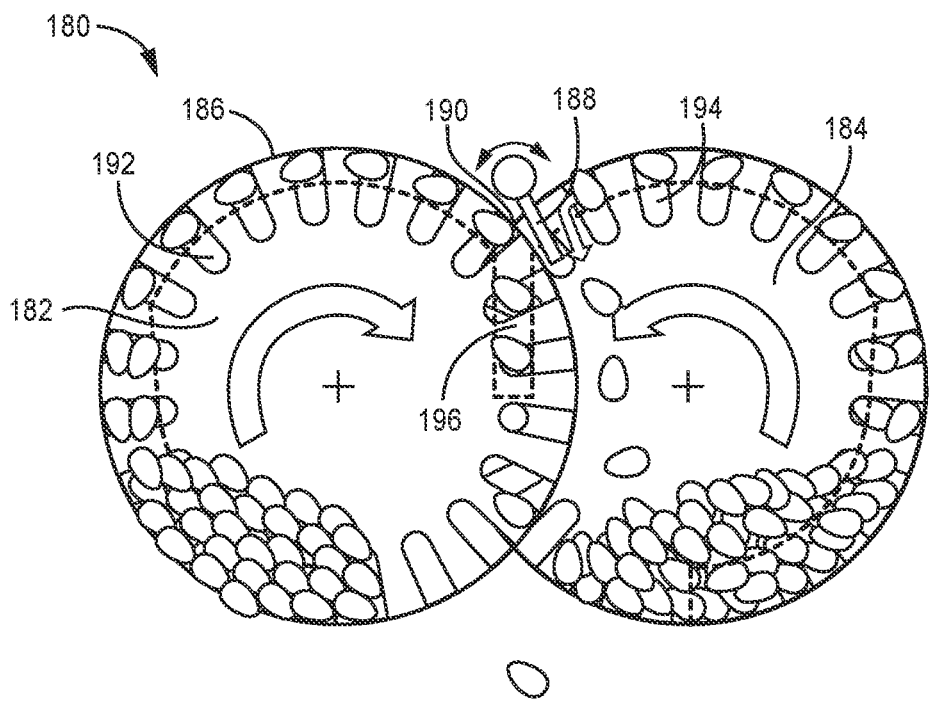
FIG. 5A is a cross-sectional side view of another seed meter system, according to a further embodiment.
Figure 5B:
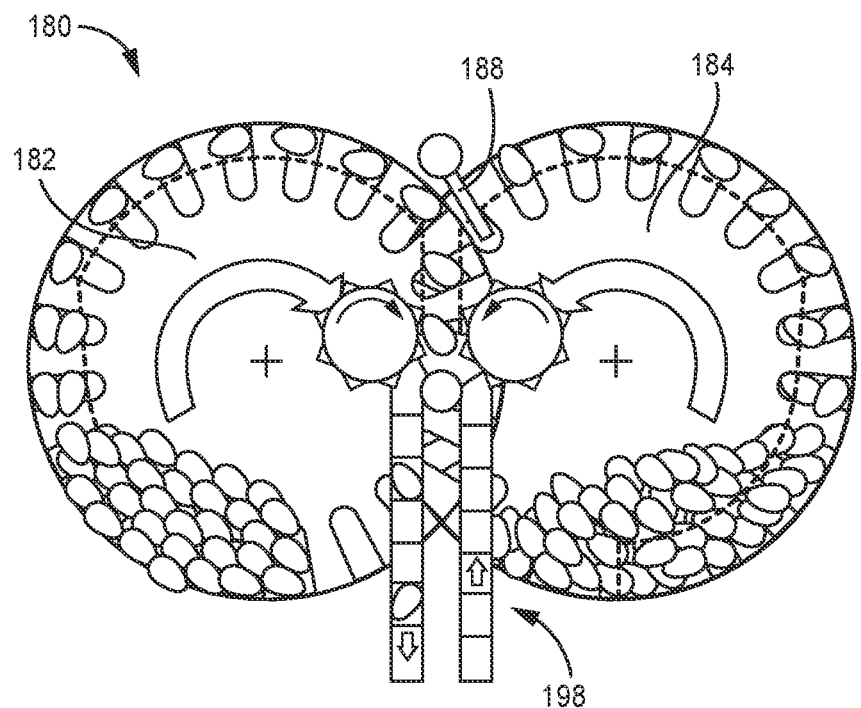
FIG. 5B is a cross-sectional side view of yet another seed meter system, according to a further embodiment.

Another implementation of a seed meter system 180 with first and second seed plates 182, 184 is shown in FIGS. 5A and 5B. The system 180 in this implementation can have substantially the same characteristics, features, and components as the system 60 described above, except as described herein. In this embodiment, the system 180 has an adjustable seed paddle (also referred to herein as a seed "knocker" or "blocker") 188 disposed on or associated with the housing 186 such that the paddle 188 is positioned adjacent to the point of overlap 190. As such, the paddle 188 can move between a first position (not shown) and a second position (as shown in FIG. 5A). That is, in the first position, the paddle 188 extends to the left based on the viewpoint of FIG. 5A such that the paddle 188 extends across the depth of the notches 192 of the first seed plate 182. The paddle 188 can be urged into this position when it is desired to block seeds 116 from the first seed plate 182 and allow transport of seeds 116 on the second seed plate 184 into the convergence region 196. Similarly, in the second position, the paddle 188 extends to the right as shown in FIG. 5A such that the paddle 188 extends across the depth of the notches 194 of the second seed plate 184. The paddle 188 can be urged into this position when it is desired to block seeds 116 from the second seed plate 184 as shown and allow transport of seeds 116 on the first seed plate 182 into the convergence region 196. Alternatively, the seed blocking mechanism 188 need not be a paddle. Instead, it is understood that any seed blocking mechanism, component, or device can be incorporated into this embodiment for the purpose of blocking the seeds 116 being delivered by one plate 182 or the other 184.

It is understood that any of the dual seed meter implementations disclosed or contemplated herein can have a similar seed blocking mechanism such as the seed paddle 188 or any other similar device or component.

FIG. 5B depicts the system 180 of FIG. 5A with a known seed delivery apparatus having a transport belt 198. One advantage of this system 180 as shown and the other system or seed plate embodiments disclosed or contemplated herein is the delivery of the seeds 116 from either plate 182, 184 to a single point in the convergence region 196. That is, the transport or release of a seed 116 to a seed delivery apparatus is more reliable as a result of the uniform transport of seeds to that single point. Further, it is understood that any of the dual seed meter implementations disclosed or contemplated herein can be combined with any known seed delivery system or apparatus of any kind, including any high-speed system.

Although the present invention has been described with reference to preferred embodiments, persons skilled in the art will recognize that changes may be made in form and detail without departing from the spirit and scope of the invention.

What is claimed is:

1. A seed metering system comprising:
   (a) a metering housing;
   (b) a first seed disk within the metering housing;
   (c) a second seed disk within the metering housing;
   (d) a vacuum chamber defined between a first wall of the metering housing and the first seed disk and the second seed disk;
   (e) a seed chamber defined between a second wall of the metering housing and the first seed disk and the second seed disk;
   (f) a first vacuum channel defined in the vacuum chamber; and
   (g) a second vacuum channel defined in the vacuum chamber;
   wherein the first vacuum channel and the second vacuum channel define a convergence region.

2. The seed metering system of claim 1, further comprising:
   (a) a first seed receptacle defined in the seed chamber, wherein the first seed receptacle is in communication with the first seed disk; and
   (b) a second seed receptacle defined in the seed chamber, wherein the second seed receptacle is in communication with the second seed disk.

3. The seed metering system of claim 1, wherein the first seed disk overlaps at least a portion of the second seed disk.

4. The seed metering system of claim 1, further comprising a vacuum duct and a vacuum port at one end of the vacuum duct, wherein the vacuum port provides fluidic communication for the vacuum duct to the vacuum chamber.

5. The seed metering system of claim 1, further comprising a seed delivery channel configured to allow seeds to exit the housing below the convergence zone.

6. The seed metering system of claim 1, wherein each of the first vacuum channel and the second vacuum channel further comprise a seed collection region, a narrowing region, and a single seed transport region.

7. The seed metering system of claim 1, wherein a rotational axis of the first seed disk is non-concentric with a rotational axis of the second seed disk.

8. A dual seed meter comprising:
   (a) a housing;
   (b) a first seed plate drive configured to drive a first seed plate within the housing;
   (c) a second seed plate drive configured to drive a second seed plate within the housing;
   (d) a first vacuum channel defined in the housing; and
   (e) a second vacuum channel defined in the housing;
   wherein the first vacuum channel and the second vacuum channel converge at a convergence zone.

9. The dual seed meter of claim 8, further comprising a seed chamber defined between a first wall of the housing and the first and second seed plates, and a vacuum chamber defined between a second wall of the housing and the first and second seed plates.

10. The dual seed meter of claim 8, further comprising:
    (a) a first seed receptacle defined in the seed chamber, wherein the first seed receptacle is in communication with the first seed disk; and
    (b) a second seed receptacle defined in the seed chamber, wherein the second seed receptacle is in communication with the second seed disk.

11. The dual seed meter of claim 8, further comprising a vacuum duct and a vacuum port at one end of the vacuum duct, wherein the vacuum port provides fluidic communication for the vacuum duct to an interior of the housing.

12. The dual seed meter of claim 8, further comprising a seed delivery channel configured to allow seeds to exit the housing below the convergence zone.

13. The dual seed meter of claim 8, further comprising at least one drive motor operatively coupled to the first seed plate drive and the second seed plate drive.

14. The dual seed meter of claim 8, wherein each of the first vacuum channel and the second vacuum channel further comprise a seed collection region, a narrowing region, and a single seed transport region.

15. The dual seed meter of claim 8, wherein each of the first seed plate and the second seed plate comprise a plurality of notches along an outer periphery.

16. The dual seed meter of claim 8, wherein a portion of the first seed plate overlaps a portion of the second seed plate.

17. A dual seed metering system comprising:
   (a) a metering housing;
   (b) a first seed disk;
   (c) a second seed disk;
   (d) a seed chamber defined between a first wall of the metering housing and the first and second seed disk;
   (e) a vacuum chamber defined between a second wall of the metering housing and the first and second seed disk;
   (f) a first vacuum channel defined in the vacuum chamber along the first seed disk; and
   (g) a second vacuum channel defined in the vacuum chamber along the second seed disk;
   wherein the first vacuum channel and the second vacuum channel converge at a convergence zone such that seeds traveling along the first seed disk and second seed disk are delivered to a single point in the convergence zone.

18. The dual seed metering system of claim 17, further comprising a seed delivery channel configured to allow seeds to exit the metering housing below the convergence zone.

19. The dual seed metering system of claim 17, further comprising:
   (a) a first seed receptacle defined in the seed chamber, wherein the first seed receptacle is in communication with the first seed disk; and
   (b) a second seed receptacle defined in the seed chamber, wherein the second seed receptacle is in communication with the second seed disk.

20. The dual seed metering system of claim 17, wherein each of the first vacuum channel and the second vacuum channel further comprise a seed collection region, a narrowing region, and a single seed transport region.

* * * * *